UnitedStates Patent Office
2,827,369
Patented Mar. 18, 1958

2,827,369

METHOD OF SEPARATING GERMANIUM FROM PRIMARY MATERIALS CONTAINING GERMANIUM AND OTHER, LESS VOLATILE, ELEMENTS

Marcel De Merre, Hoboken-lez-Anvers, Belgium, assignor to Societe Generale Metallurgique de Hoboken, Hoboken-lez-Anvers, Belgium, a limited company of Belgium No Drawing. Application December 20, 1954
Serial No. 476,581

Claims priority, application Great Britain
December 23, 1953

2 Claims. (Cl. 75—1)

This invention relates to a process for the separation of germanium from primary materials containing germanium and other, less volatile, elements, such as Cu, Bb, Zn, Fe.

The volatility of the sulfide and suboxide of Ge is a well-known property which has already been utilized for the separation of germanium.

It has been proposed, in order to avoid the formation of non-volatile compounds, to carry out such volatilization in a reducing atmosphere, by means of producer gas, gas rich in hydrogen, or industrial gases containing CO or hydrocarbons, or mixtures of various reducing gases.

When treating for instance Cu-Pb sulfide ores containing Ge in a furnace, Ge is recovered in the dust, together with volatile elements, such as As and Cd.

Such a recovery of Ge has hitherto been far from complete, owing to the fact that a high percentage of the Ge is retained in the silicious slag which has been formed during the smelting of the ore.

The present invention has for its object to obtain a better recovery, or even an almost complete separation, of the Ge from the primary material.

The invention consists in treating the primary material in a current of reducing or neutral gases under conditions preventing a fusion of the primary material, and collecting after volatilization practically the whole amount of germanium contained in the primary material.

The reaction is carried out in a reducing atmosphere in the presence of a high percentage of a carbonaceous material, capable of substantially raising the fusion point of the germanium-containing raw material, intimately mixed with a suitable amount of the substance to be treated to form compacted shaped bodies, and under suitable physical conditions with the ultimate object of preventing fusion of the primary material and obtaining a substantially complete volatilization of the germanium.

Under such conditions, as is volatilized mainly in metal form. Any sulphur present in the collected dust is fixed to the elements Pb, Zn, Cd, not to As.

The primary material and the carbon-containing substance, both preferably in a finely-divided state, are intimately mixed with each other and the mixture is brought into the form of shaped compact bodies, such as briquettes, nodules or pastilles.

As the solid carbon-containing substance, use may be made of finely divided coal or coke, or of finely-divided lignite, turf or peat, or fossil wood. Use may also be made of oily or tarry residues from the distillation of fats and oils, owing to the faculty which these residues possess of producing compact but non-fusible agglomerates.

The working temperature is preferably between 800 and 1000° C., and an addition of from 5 to 20%, of lignite, peat or fossil wood or 5 to 10% of residues from a refining operation of oils or fats, is sufficient for preventing a fusion of the mass, in the case of ores or metallurgical by-products (concentrates) which have a normal melting point of about 700° C.

For carrying the invention into effect, use may advantageously be made of a furnace comprising a vertical retort into which the primary materials are fed through a tight-joint hopper, or through two superposed hoppers.

The briquettes, nodules or pastilles, are mixed with about 10–15% of coke or charcoal in pieces of about the same size as that of the briquettes, nodules or pastilles, so as to prevent the latter from sticking together and from sticking to the walls of the furnace, and to ensure a regular movement of the charge downwards through the retort.

Such a vertical furnace may be entirely made of carborundum. Certain parts of the condensers attached to the oven, which are subjected to temperatures up to 300% C., may also be made of carborundum so as to avoid the presence of metallic parts with which Ge would become combined; this would mean a lower output and a rapid wear of the apparatus.

The reducing gas, such as CO, may be admitted both at the upper and at the lower part of the furnace, in such a quantity as to ensure a rapid volatilization of the Ge while preventing fusion and to carry over the As and other volatile material to the outlet of the furnace. The proportions of gas admitted at the upper and at lower part of the furnace may be different and may vary with the nature of the primary material, more particularly with the percentage of elements which are volatile at a lower temperature than that required for the volatilization of the Ge, such as As, Sb. The gases, however, may be admitted either at the upper part alone, or at the lower part alone of the furnace, in the first case when there is a very high proportion of volatile material, and in the second case in the absence of a very high proportion of volatile material.

The charge may be progressively heated up to about 800°–1000° C. according to the nature of the material treated and the heating is continued at such a temperature until a practically complete removal of germanium has been effected.

The gases produced are preferably withdrawn through a side opening provided in the furnace at about the level of the maximum temperature in the furnace.

The compacted bodies of an admixture of the primary material (fusible at a temperature between about 600 and 700° C.) with carbonaceous material are treated in a vertical furnace.

The invention may be carried out in a continuous manner. In a continuous process, the charge is continuously admitted, and the de-germanized material is continuously withdrawn from the furnace.

*Example 1*

A very fine concentrate (about 300 mesh) of sulfides of Pb-Cu-Zn containing a small amount of Ge and having the following composition: Pb 62.4%; Cu 8.5%; As 8.5%; Sb 0.11%; Zn 6.1%; Fe 1.1%; Cd 0.21%; Ge 0.17%; S 18.0%; the rest being $SiO_2$, CaO, $Al_2O_3$, is intimately mixed with 12% of lignite in the form of a fine powder (of about 300 mesh). The mixture is compressed into pastilles of cylindrical shape of a height of about 3 cm. and a diameter of about 2 cm.

The pastilles are mixed with about 12% of charcoal sized between 2 and 4 cm.

The mixture is fed into a vertical furnace made of carborundum bricks, and the outlet of the gases from the furnace is situated in the zone of the furnace where the temperature is 850° C.

The furnace is operated in a continuous manner. It is fed through a tight-joint hopper and it is emptied through a discharge valve.

Reducing gas is admitted, through the hopper and from underneath the furnace in proximity of the discharge valve, said reducing gas containing 32% CO and 0.2% $CO_2$, the rest being $N_2$.

The pastilles recovered from the furnace contain 0.007% Ge and 0.05% As. The volatilization of Ge and As is of about 96%. The dust recovered in the condensers contains 75 to 82% As, 1.8 to 2.3% Ge, 3 to 4% S and 3.6% Pb. The dust is subjected to a refining operation for obtaining $GeO_2$ of high purity.

In a process such as above described, the germanium contained, together with metallic As, in the condensate thus obtained, may be recovered in a simple and economic manner as a residue by an oxidizing roasting of the condensate, which eliminates the As.

Such a roasting may be carried out at a temperature of 550 to 700° C. in an oxidizing atmosphere, for instance of air. The As is oxidized to $As_2O_3$ and is volatilized; the Ge remains in the residue.

The oxidizing roasting may be carried out without any agitation of the material; the latter is for instance treated under a thickness of 10 to 30 mm.

The residue obtained after volatilization of As is treated by known methods, for instance by distillation of $GeCl_4$, in order to obtain pure Ge.

Example 2

By applying the method of volatilization in a reducing atmosphere of As and Ge as described above, from a sulfide ore of Pb containing 8.5% As and 0.21% Ge, a condensate was obtained having the following composition:

| | Percent |
|---|---|
| As | 78.8 |
| Ge | 1.9 |
| Pb | 3.6 |
| S | 3.3 |

The condensate was placed upon trays in layers having a thickness of 18 to 20 mm. and was roasted during 4 hours at 540–550° C. in an electric furnace heated by radiation.

A residue was obtained containing:

| | Percent |
|---|---|
| As | 12.2 |
| Ge | 14.4 |
| Pb | 28.2 |

96.7% of the Ge contained in the condensate averaging 1.9% Ge have been recovered in the form of a residue averaging 14.4% Ge.

The $As_2O_3$ collected at the outlet of the furnace titrated:

| | |
|---|---|
| Ge | 7.49%. |
| As | Less than 0.005%. |

I claim:

1. A continuous process for recovering practically the entirety of germanium values from sulfide primary materials having a softening point below about 700° C. containing small proportions of germanium sulfide in admixture with major proportions of such sulfides as lead, copper, zinc, arsenic and iron, which comprises compacting a mixture of such a primary material with from about 5 to 20% of an added carbonaceous material into the form of shaped bodies, such carbonaceous material being in an amount sufficient to prevent the softening of the shaped bodies at a temperature of between about 800° and 1000° C., mixing said compacted shaped bodies with 10–15% of pieces of about the same size as that of the shaped bodies, of a carbonaceous substance chosen from the class consisting of coke and charcoal, thus preventing the sticking together of the shaped bodies, allowing the latter mixture of shaped bodies and pieces to pass downwardly through a vertical reaction zone, externally heating the contents of the reaction zone to a temperature range of about 800 to 1000° C. without the shaped bodies sticking together, continuously blowing reducing gas through the vertical reaction zone, withdrawing reaction gases containing practically the entirety of germanium in the form of sulfide from the vertical reaction zone and condensing germanium therefrom outside the reaction zone.

2. A process as claimed in claim 1, in which the carbon containing substance which is mixed with the germanium containing material consists of residues from an oil refining operation.

References Cited in the file of this patent
UNITED STATES PATENTS

| 2,362,718 | Pidgeon | Nov. 14, 1944 |
| 2,533,142 | Royster | Dec. 5, 1950 |
| 2,558,744 | Fouquet | July 3, 1951 |
| 2,588,008 | Jones et al. | Mar. 4, 1952 |
| 2,719,081 | Allen et al. | Sept. 27, 1955 |

FOREIGN PATENTS

| 378,017 | Great Britain | July 22, 1932 |

OTHER REFERENCES

Jour. of Applied Chem., vol. 1, Dec., 1951, pages 541–551.

Chem. Abstracts, 1952, page 2986.